United States Patent [19]

Adomeit

[11] Patent Number: 4,989,901
[45] Date of Patent: Feb. 5, 1991

[54] VERTICAL ADJUSTMENT MEANS FOR A FITTING OF A SAFETY-BELT RESTRAINING SYSTEM IN MOTOR VEHICLES

[75] Inventor: Heinz-Dieter Adomeit, Berlin, Fed. Rep. of Germany

[73] Assignee: TRW Repa GmbH, Fed. Rep. of Germany

[21] Appl. No.: 401,084

[22] Filed: Aug. 31, 1989

[30] Foreign Application Priority Data

Sep. 2, 1988 [DE] Fed. Rep. of Germany ....... 3829929

[51] Int. Cl.⁵ ............................................. B60R 22/20
[52] U.S. Cl. ...................................... 280/808; 403/93; 248/291
[58] Field of Search ................ 280/808, 801; 297/468, 297/483; 248/297.3, 291; 403/93

[56] References Cited

U.S. PATENT DOCUMENTS

| 496,834 | 5/1983 | Landis | 403/93 |
| 3,561,713 | 2/1971 | Berkowitz | 248/291 |
| 4,473,243 | 9/1984 | Ogawa | 297/483 |
| 4,681,346 | 7/1987 | Yoshitsugu | 280/808 |
| 4,949,994 | 8/1990 | Zawisa | 280/802 |

FOREIGN PATENT DOCUMENTS

| 1214104 | 3/1963 | Fed. Rep. of Germany . |
| 2460092 | 6/1976 | Fed. Rep. of Germany . |
| 2539359 | 3/1977 | Fed. Rep. of Germany ...... 297/483 |
| 2613654 | 10/1977 | Fed. Rep. of Germany . |
| 2225011 | 10/1974 | France ................. 280/801 |
| 57-172851 | 10/1982 | Japan .................... 280/804 |

Primary Examiner—Richard A. Bertsch
Assistant Examiner—Karin Tyson
Attorney, Agent, or Firm—Tarolli, Sundheim & Covell

[57] ABSTRACT

The vertical adjustment means for a guide fitting (10) of a safety-belt restraining system in motor vehicles comprises as essential loadbearing element an elongated plate (14) which is mounted pivotally at its one end on the vehicle bodywork while at its other end the guide fitting (10) is secured. By a detent means (16, 30) the elongated plate (14) can be selectively locked in various pivot positions. The height of the guide fitting (10) set is defined by the pivot position of the elongated plate (14).

11 Claims, 4 Drawing Sheets

VERTICAL ADJUSTMENT MEANS FOR A FITTING OF A SAFETY-BELT RESTRAINING SYSTEM IN MOTOR VEHICLES

The invention relates to a vertical adjustment means for a fitting of a safety-belt restraining system in motor vehicles.

Such vertical adjustment means are known in numerous constructional forms. In three-point safety-belt systems generally a guide fitting is mounted on a slide which is displaceable in a rail extending at least approximately perpendicularly and anchored to the vehicle bodywork and can be locked in various positions. The detent means and the rail as well as the slide must be dimensioned for the very high accident stresses because release of the locking under load would permit an undesired or inadmissible forward movement of the vehicle occupant to be secured. To fulfil the strict requirements made of the mechanical strength conventional vertical adjustment means are therefore dimensioned relatively large and heavy.

The invention provides a vertical adjustment means for a fitting of a safety-belt restraining system in motor vehicles which with a few light and simple components also meets strict strength requirements.

This is achieved according to the invention by a vertical adjustment means of the kind defined above and wherein the following provisions are made: firstly the fitting is secured at the one end to an elongated plate which is mounted at its other end pivotally on the vehicle bodywork; secondly, the elongated plate is selectively lockable in various pivot positions by a locking means; furthermore, the height of the fitting set is governed by the pivot position of the elongated plate. In the vertical adjustment means according to the invention the principle of a slide guided in a rail is thus abandoned. The loadbearing element is the elongated plate which is essentially only tension stressed. The locking means which defines the pivot position of the elongated plate and can be constructed as detent means is stressed under load only by the relatively small transverse components which arise when the belt pulling direction deviates from the longitudinal direction of the elongated plate. Since however the belt pulling direction when the vertical adjustment means is correctly set substantially coincides with the longitudinal direction of the elongated plate, a deformation of the locking means or detent means under load can also be allowed. A defined plastic deformation of the locking means under load may even be utilized to obtain a force limitation and energy absorption.

The locking means constructed as detent means preferably comprises a number of detent openings spaced from each other along a circular arc concentric with the pivot bearing of the elongated plate and a detent pin adapted to be brought selectively into engagement with said detent openings. The detent openings are arranged in a member which is secured to the vehicle bodywork. This member may be an integrated part of the vehicle bodywork, for example in the form of a welded-on metal plate, or subsequently fitted and secured by means of a threaded bolt which serves in accordance with usual standards to secure a conventional guide or end fitting.

The latter solution is particularly suitable for subsequent equipping of the rear safety-belt systems with a vertical adjustment means.

Further advantageous developments of the vertical adjustment means reside in that the elongated plate is mounted by means of a slot on a pin which forms the pivot bearing thereof and is anchored to the vehicle bodywork. The elongated plate is displaceable against spring force in its longitudinal direction for releasing the detent engagement thereof. After release of the detent engagement the elongated plate can be pivoted until its detent bolt drops under the action of the spring into the respective next detent opening.

Further advantageous developments of the invention are apparent from the subsidiary claims.

Two embodiments of the invention will now be described in detail with reference to the drawings, wherein.

Figure 3:
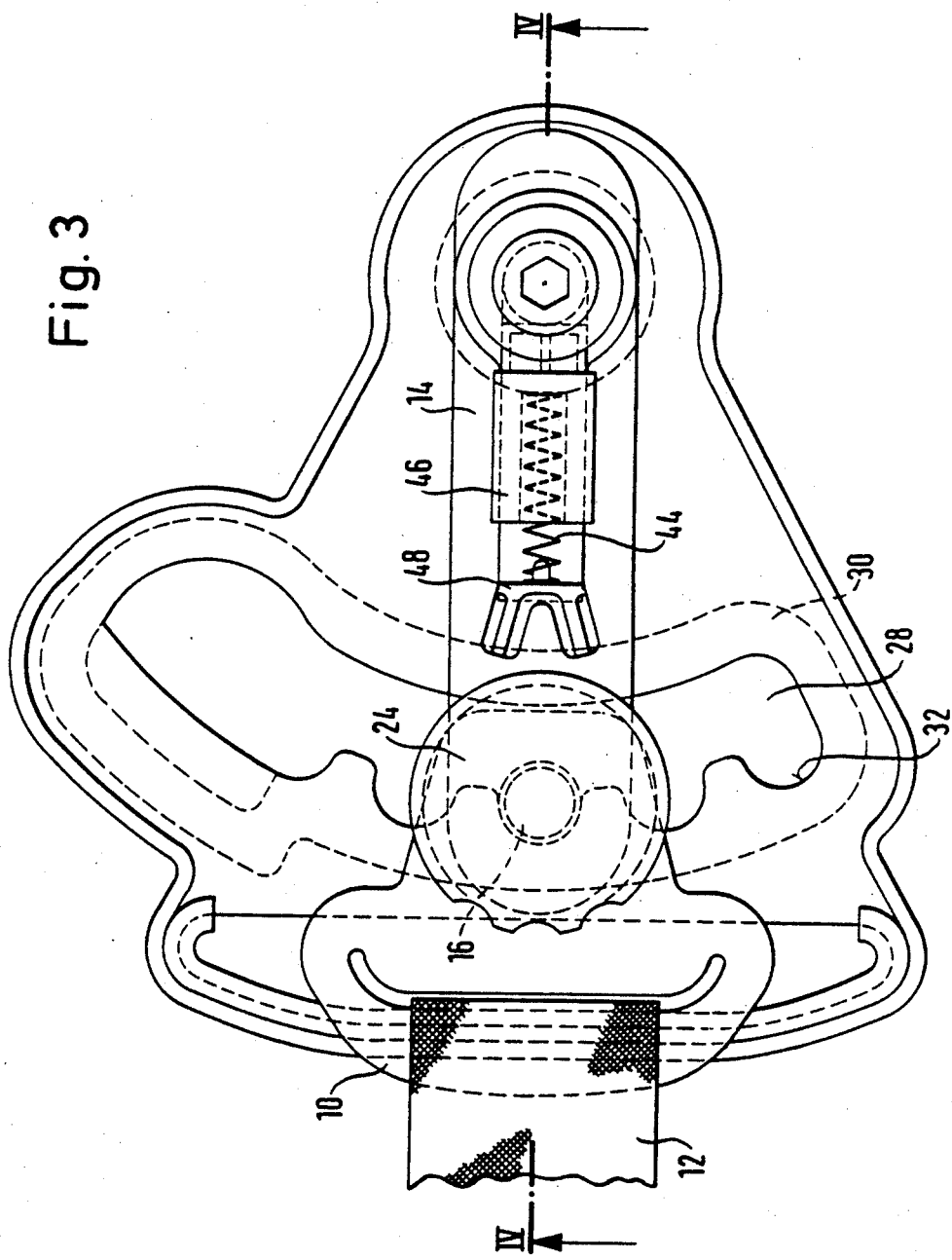
FIG. 3 is a plan view of a second embodiment of the vertical adjustment means.
Figure 4:
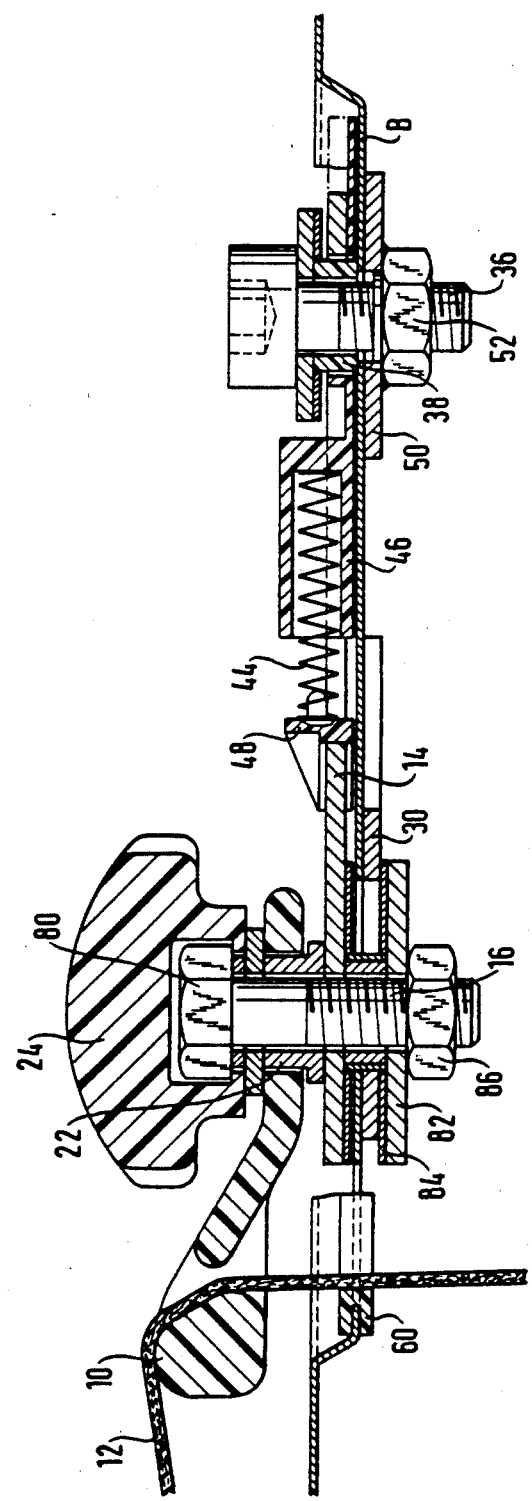
FIG. 4 is a section along the line IV—IV of FIG. 3.

Both embodiments of the vertical adjustment means are particularly suitable for the rear safety-belt systems of an automobile. The first embodiment shown in FIGS. 1 and 2 is for optional fitting or subsequent fitting whilst the second embodiment shown in FIGS. 3 and 4 is designed as system fixedly integrated into the vehicle.

Figure 1:
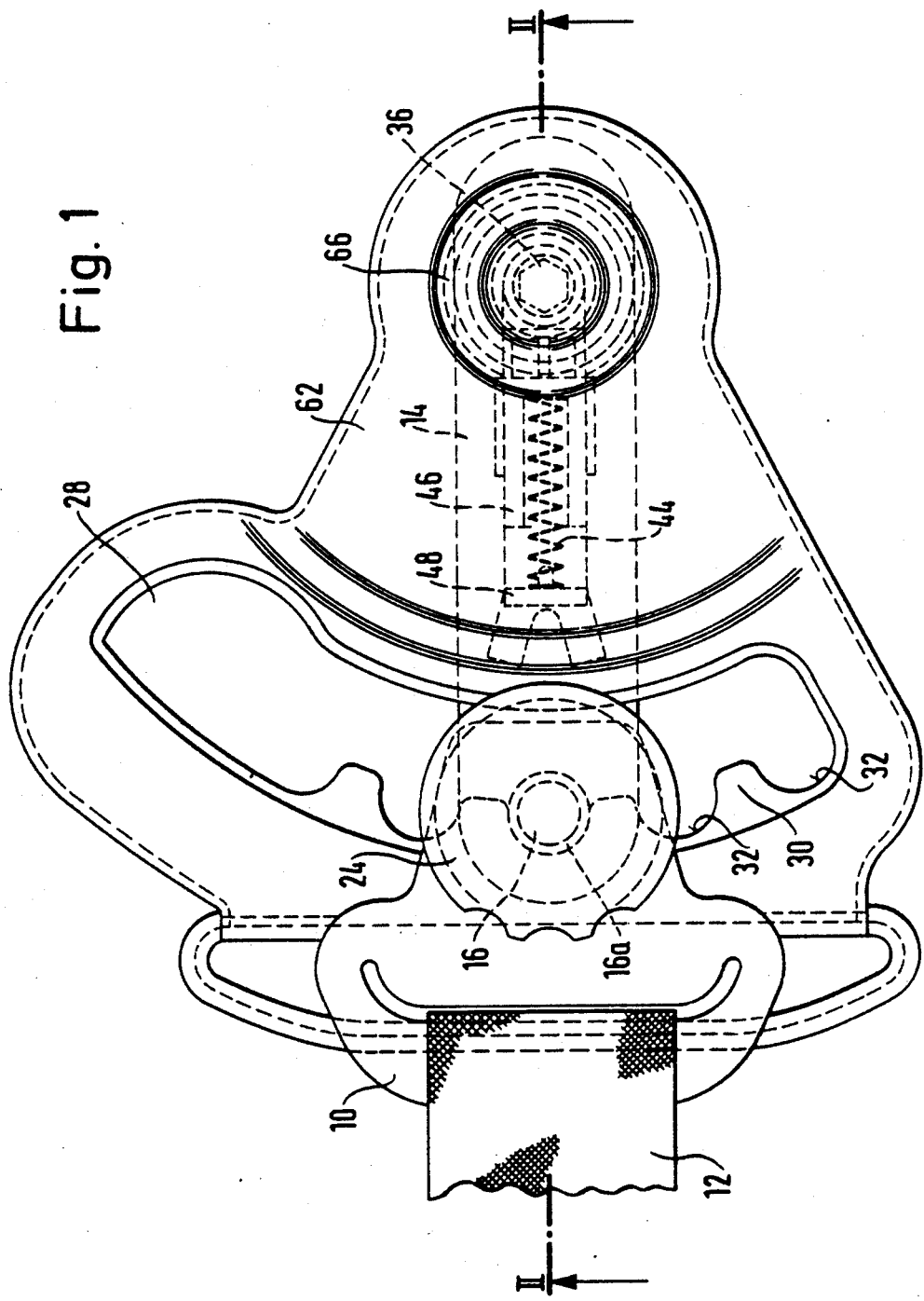
FIG. 1 is a schematic plan view of a first embodiment of the vertical adjustment means.
Figure 2:
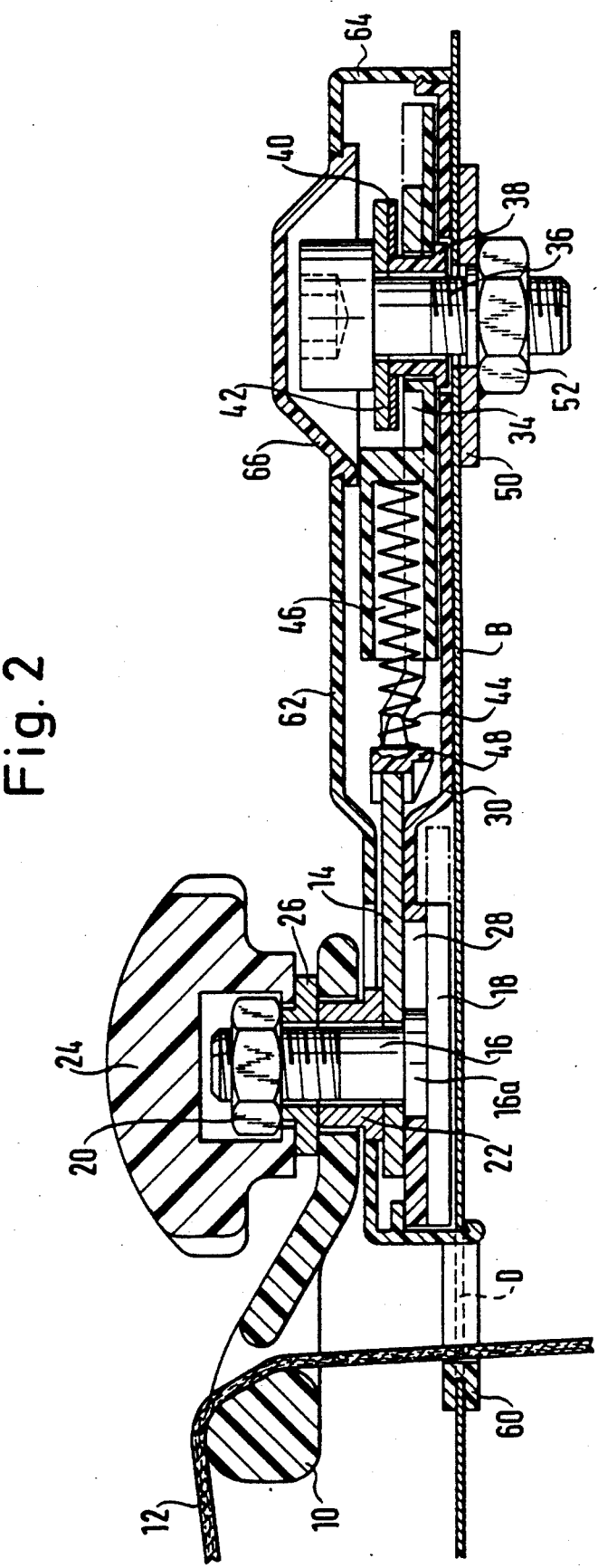
FIG. 2 is a section along the line II—II of FIG. 1.

In FIGS. 1 and 2 firstly a guide or end fitting 10 can be seen having a guide slot through which the webbing 12 runs. The guide fitting 10 is secured to the one end of a loadbearing elongated plate 14 by means of a threaded bolt 16 which is anchored at its other end in a holding plate 18, lead with its shank through a bore of the elongated plate 14 and onto the other end of which a nut 20 is screwed. The guide fitting 10 is rotatably mounted by means of a bush 22 on the shank of the threaded bolt 16. A knurled actuating grip 24 comprises a recess for receiving the nut 20 and is provided with a radially inwardly projecting edge which engages behind the nut 20 to secure the actuating grip 24 on the nut 20. A bush 26 with integrally formed spacer washer is inserted between the actuating grip 24 and guide fitting 10.

The shank of the threaded bolt 16 is further passed through an arcuate slot 28 of a detent plate 30. At its end adjacent the holding plate 18 the shank of the threaded bolt 16 comprises a cylindrical widening 16a. Said cylindrical widening 16a is formed to match approximately semicircular detent openings 32 which are arranged spaced apart along the arcuate slot 28.

At its end remote from the actuating grip 24 the elongated plate 14 is provided with a slot 34 extending in the longitudinal direction thereof. Said slot 34 serves firstly for the pivotal mounting of the elongated plate 14 on a threaded bolt 36 mounted on the vehicle bodywork and secondly as guide for a limited longitudinal displacement of the elongated plate 14 with respect to the threaded bolt 36. The shank of the threaded bolt 36 is surrounded by a plastic bush 38 which is received in the slot 34. Between the plastic bush 38 and the head of the threaded bolt 36 a guide washer 40 and a counter washer 42 are also arranged. The slot 34 further serves to receive a pressure spring 44 which bears at its end facing the threaded bolt 36 on the bottom of a guide member 46 which is inserted in form-locking manner into the slot 34. At its other end the pressure spring 44 bears on a bearing member 48 which is provided with an integrally formed guide pin and which is held at a narrow side of the slot 34.

As apparent from FIG. 2 this embodiment of the vertical adjustment means is placed onto the metal sheet B of the vehicle bodywork. At the rear side of the sheet B in conventional manner a reinforcing plate 50 is welded on to which a nut 52 is secured into which the threaded bolt 36 is screwed. The sheet B comprises a passage opening D for the webbing 12. A lining may be secured at the edges of said passage opening D. The lining includes the parts designated in FIG. 2 by 60, 62, 64 and 66, of which the part 62 engages behind the edge of the passage opening D with a lip whilst the part 64 is connected to the detent plate 30 by a snap-action connection. The detent plate 30 is in turn secured by means of the threaded bolt 36 to the vehicle bodywork.

In FIG. 2 the locked position of the elongated load-bearing plate 14 is shown in continuous lines and the unlocked position of said elongated plate 14 in dot-dash lines. Due to its slot 34 the elongated plate 14 can be displaced via the actuating grip 24 against the force of the pressure spring 44 in its longitudinal direction in order to release the detent pin formed by the shank of the threaded bolt 16 or the part 16a thereof out of the respective detent opening 32. Thereafter the elongated plate 14 can be pivoted with the guide fitting 10 into the desired position, whereupon the pressure spring effects an automatic engagement into the next detent opening 32 which can be reached.

With the orientation of elongated plate 14 and webbing 12 shown in FIG. 2 the tensile load from the belt system is transmitted practically solely via the elongated plate 14 and the threaded bolt 36 to the vehicle bodywork. The detent plate 30 need not be an element dimensioned to bear loads. It may also be a deformable member which can even consist of plastic.

In the embodiment according to FIGS. 3 and 4 the metal sheet B of the vehicle is provided with a punched-out portion and impression for easier integration of the vertical adjustment means. In contrast to the embodiment of FIGS. 1 and 2 the detent plate 30 is not secured to the threaded bolt 36 but secured directly to the vehicle sheet, for example welded. Furthermore, the threaded bolt 16 is provided with a bolt head 80 which is received in a recess of the actuating grip 24 and is led with its threaded portion through a counter plate 82 which bears via a sliding washer 84 on the detent plate 30 and is secured by a nut 86 which is screwed onto the end of the threaded bolt 16.

The lining, which is cut to the wishes of the vehicle manufacturer, has not been shown in FIGS. 3 and 4.

Otherwise, the construction and mode of operation of the embodiment according to FIGS. 3 and 4 are the same as in the embodiment according to FIGS. 1 and 2 and consequently another description thereof would be superfluous.

I claim:

1. A vertical adjustment device for adjusting a fitting of a safety belt-restraining system in a motor vehicle to a selected one of a plurality of different levels with respect to a vehicle bodywork to which said restraining system is mounted, said vertical adjustment device comprising:

an elongate plate having a first end to which said fitting is secured and a second end pivotally mounted about a pivot axis fixed to the vehicle bodywork;

locking means for selectively locking said elongate plate in one of a plurality of different pivotal positions with respect to the vehicle bodywork, each pivotal position of said elongate plate defining a respective one of said plurality of different levels for said fitting;

said locking means comprising a detent pin fixed to said elongate plate at said first end of said elongate plate, and a plurality of detent openings formed in a member secured to the vehicle bodywork, said detent openings being spaced apart along an arc concentric with said pivot axis of said elongate plate, said detent pin being selectively engageable with said detent openings;

said elongate plate having at its second end a longitudinally extending slot accomodating said pivot axis for allowing displacement of said elongate plate in its longitudinal direction with respect to said pivot axis, between a first position away from said pivot axis in which said detent pin engages a respective one of said detent openings, and a second position closer to said pivot axis in which said detent pin is disengaged from said detent openings; and spring means for urging said elongate plate away from said pivot axis and into said first position;

wherein said detent pin is formed as a bolt securing said fitting to said first end of said elongate plate.

2. A vertical adjustment device according to claim 1, wherein said member secured to the vehicle bodywork comprises a detent plate having generally the shape of a circular segment and having an arcuate slot concentric with said pivot axis, said detent openings being formed in said arcuate slot.

3. A vertical adjustment device according to claim 2, wherein said member deforms a defined amount under restraint load applied to said safety-belt restraining system.

4. A vertical adjustment device according to claim 3, wherein said member is made of plastic.

5. A vertical adjustment device according to claim 1, wherein said member is secured to the vehicle bodywork by a second bolt and said second bolt defines said pivot axis of said elongate plate.

6. A vertical adjustment device according to claim 1, wherein said member deforms a defined amount under restraint load applied to said safety-belt restraining system.

7. A vertical adjustment device according to claim 6, wherein said member is made of plastic.

8. A vertical adjustment device according to claim 1 and further comprising a manual actuating grip secured to said bolt.

9. A vertical adjustment device according to claim 1, wherein said spring means comprises a spring accomodated in said elongate slot and trapped between said pivot axis and said elongate plate.

10. A vertical adjustment device according to claim 3, wherein said fitting is a deflection fitting.

11. A vertical adjustment device according to claim 5, wherein said vertical adjustment device is shaped and dimensioned so as to be usable to replace a non-adjustable fitting of a rear safety-belt system of an automobile by bolting said vertical adjustment device to the vehicle bodywork with said second bolt.

* * * * *